United States Patent [19]
Fischer

[11] Patent Number: 6,065,657
[45] Date of Patent: May 23, 2000

[54] EXPANDABLE COAT HOOK ASSEMBLY

[75] Inventor: Douglas A. Fischer, Grand Rapids, Mich.

[73] Assignee: Lear Donnelly Overhead Systems, LLC, Novi, Mich.

[21] Appl. No.: 09/126,868

[22] Filed: Jul. 31, 1998

Related U.S. Application Data

[60] Provisional application No. 60/054,475, Aug. 1, 1997.

[51] Int. Cl.[7] ....................................................... B60R 7/10
[52] U.S. Cl. ............................ 224/313; 224/927; 248/307
[58] Field of Search ..................................... 224/313, 927; 248/304, 307

[56] References Cited

U.S. PATENT DOCUMENTS

| | | |
|---|---|---|
| 3,385,547 | 5/1968 | West . |
| 3,424,418 | 1/1969 | Freedman et al. . |
| 4,221,354 | 9/1980 | Kempkers . |
| 4,444,344 | 4/1984 | Marcus et al. . |
| 4,645,106 | 2/1987 | Pawl . |
| 4,720,028 | 1/1988 | Takemura et al. . |
| 5,104,083 | 4/1992 | Shannon . |
| 5,226,569 | 7/1993 | Watjer et al. . |
| 5,366,127 | 11/1994 | Heinz . |
| 5,411,233 | 5/1995 | Grimes, III et al. . |
| 5,492,260 | 2/1996 | Rieden et al. . |
| 5,507,423 | 4/1996 | Fischer et al. . |
| 5,636,891 | 6/1997 | Van Order et al. ...................... 224/313 |

*Primary Examiner*—Stephen P. Garbe
*Attorney, Agent, or Firm*—Brooks & Kushman P.C.

[57] ABSTRACT

A retractable coat hook assembly comprising a coat hook moveably mounted to a mounting bracket secured to a vehicle roof. The coat hook has a base portion with opposing side walls. A pair of pins extends from each side wall and is received in corresponding grooves in the mounting bracket to rotate the coat hook downwardly about non-fixed rotational axis and translate the coat hook away from the bracket when the coat hook is moved from a retracted to an extended position.

23 Claims, 2 Drawing Sheets

EXPANDABLE COAT HOOK ASSEMBLY

CROSS-REFERENCE TO RELATED APPLICATIONS

This application claims priority on U.S. application Ser. No. 60/054,475, filed Aug. 1, 1997.

BACKGROUND OF THE INVENTION

1. Field of the Invention

This invention relates to an expandable coat hook for use in a passenger compartment of an automobile and, in particular, to coat hooks which move downward and outward to expand the serviceability of the coat hook.

2. Description of the Related Art

Coat hooks are installed in the roof of the passenger compartment of automobiles to permit the hanging of articles of clothing while traveling. It has been the objective of automobile interior manufactures to create coat hooks that can accommodate many articles and are easy to use, yet remain inconspicuous when not in use. Prior devices employ springs to return hooks to their non-use position, either substantially flush with or inside the headliner. Some hooks are mounted on pivots for rotation about an axis for movement from an in-use position to a non-use position. However, each design is limited by the size of the hook: If a small hook is used, only a few articles can be hung. Large hooks form an unnecessary obstruction in the cabin when not in use.

SUMMARY OF THE INVENTION

The expandable coat hook assembly of the invention provides a coat hook for a vehicle which is mounted in a housing for adjustment to accommodate the number of articles to be hung. One embodiment of the invention is a retractable coat hook assembly for use in a vehicle passenger compartment comprising a roof with a roof bracket and a vehicle headliner positioned adjacent the roof. The roof bracket and headliner have complementary openings through which vehicle accessories can be mounted to the roof while still being accessible within the passenger compartment. The retractable coat hook assembly comprises a mounting bracket having a mounting portion adapted to be received through the corresponding openings in the headliner and roof bracket. The mounting portion includes retainer surfaces that are adapted to seat behind the roof bracket to mount the mounting bracket to the roof bracket and within the passenger compartment. The coat hook assembly further includes a coat hook having an elongated body with a base and a tip. The base is mounted to the mounting bracket for rotational and translational movement with respect thereto. The coat hook is moveable between a retracted and extended position with respect to the mounting bracket and thereby rotationally and translationally move the coat hook tip away from the mounting bracket.

Preferably, the mounting bracket further includes opposing spaced side ribs with each side rib having at least one slot with first and second ends. Additionally, the coat hook base can have opposing side walls corresponding to the side ribs. Each side wall of the base has a pin that is received within the corresponding slot of the corresponding side rib. As the pins slide from the first end to the second end of the slot, the coat hook is moved from the retracted to the extended position.

It is preferred that there be two slots on each side rib with a corresponding number of pins on each side wall of the hook. The slots of each pair of slots can have different radii of curvature to thereby rotate the coat hook away from the mounting bracket as the pins are slid from the first end to the second end of their corresponding slot during the movement of the coat hook from the retracted position to the extended position. Each of the slots can have a detent at their second end to hold the hook in the retracted position.

In another embodiment, the invention is a vehicle comprising a roof with a mounting bracket and defining a portion of a passenger compartment. The roof bracket has an opening. The vehicle further comprises a retractable coat hook assembly including a mounting bracket having a mounting portion adapted to be received through the roof bracket opening. The mounting bracket further includes retainer surfaces which seat behind the roof bracket to mount the mounting bracket within the passenger compartment. The coat hook assembly additionally includes a coat hook having an elongated body with a base and a tip. The base being moveably mounted to a portion of the mounting bracket for rotation between a retracted position and an extended position. As the coat hook is moved from the retracted position to the extended position, the coat hook is rotated downwardly and translated away from the mounting bracket.

BRIEF DESCRIPTION OF THE DRAWINGS

The invention will now be described with reference to the drawings in which.

DETAILED DESCRIPTION

Figure 1:
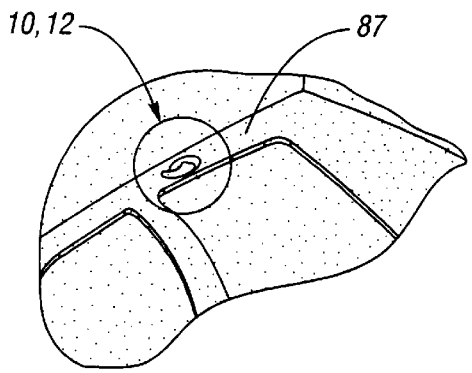
FIG. 1 is a partial perspective view illustrating a vehicle passenger compartment with a coat hook assembly according to the invention.
Figure 2:
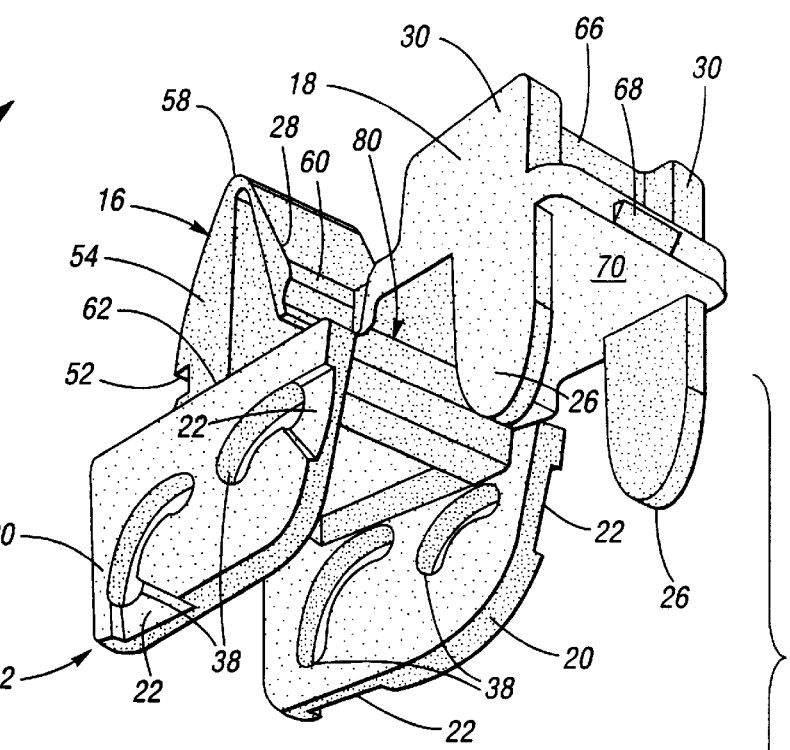
FIG. 2 is a perspective exploded view of an unassembled coat hook assembly for a passenger compartment of an automobile according to the invention.
Figure 2:
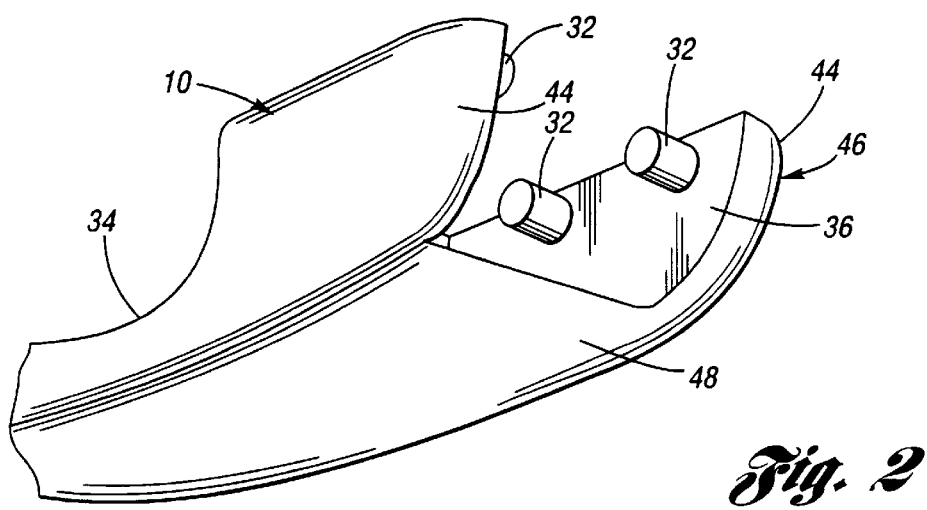

Referring now to FIGS. 1–4, an expandable coat hook assembly is shown having a mounting bracket 12 for receiving a slidable and pivotable coat hook 10. As best shown in FIG. 2, the coat hook 10 includes a U-shaped base 46 with a face portion 48 joining an elongated shank or hook 34 and two sides 44, each side having inwardly projecting pins 32 in a recessed portion 36. The hook 34 terminates in a tip. The inverted U-shaped mounting bracket 12 comprises side ribs 20 extending from a platform 21 having an opening 23, defined by a perimetal edge 25. Each opposing rib 20 has pin lead-in grooves 22 with corresponding arcuate cam slots 38 extending between first and second ends, with the first ends located nearest a retainer 18. The second end of each cam slot includes a depressed area or detent. The lead-in grooves 22 extend from one end of the cam slots to the peripheral edge of the corresponding ribs. The opening 23 receives a retainer 18 that is hingedly mounted to the platform 21. A mounting clip 16 is mounted to the opposite side of the platform 21 than the side ribs 20.

The inverted V-shaped mounting clip 16 includes both a fixed leg 54 and a movable leg 28 joined at an apex 58, leaving an opening between the legs. The fixed leg 54 is connected to the platform 21 at a fixed end 62 of the leg 54. The mounting clip 16 is adapted to be received within a roof assembly comprising a metal roof or roof bracket 86 against which is positioned a headliner 87. The fixed leg 54 also has a slot 52 near its fixed end 62 for receiving an opening edge 88 in the vehicle sheet metal roof bracket 86. The movable leg 28 has a groove 60 at a free end 64 for forcibly engaging an opening edge 90 of the vehicle roof bracket 86, thereby securing the mounting bracket 12 to the vehicle roof bracket 86.

The retainer 18 is joined to the mounting bracket 12 by a living hinge 80 and includes opposing mandrels 26. When the retainer 18 is rotated about the hinge 80, the mandrels 26 extend into the opening between the legs 28 and 54 and bear against legs 28 and 54, thereby blocking moveable leg 28 from movement toward the fixed leg 54. Further, retainer ribs 30 block the side ribs 20 of the mounting bracket 12 against inward movement, effectively securing the pins 32 in the cam slots 38. Upon full rotation of the retainer 18, a wedge-shaped tab 68 releasably locks the retainer 18 behind a portion of an undercut 74 on the mounting bracket 12.

Figure 3:
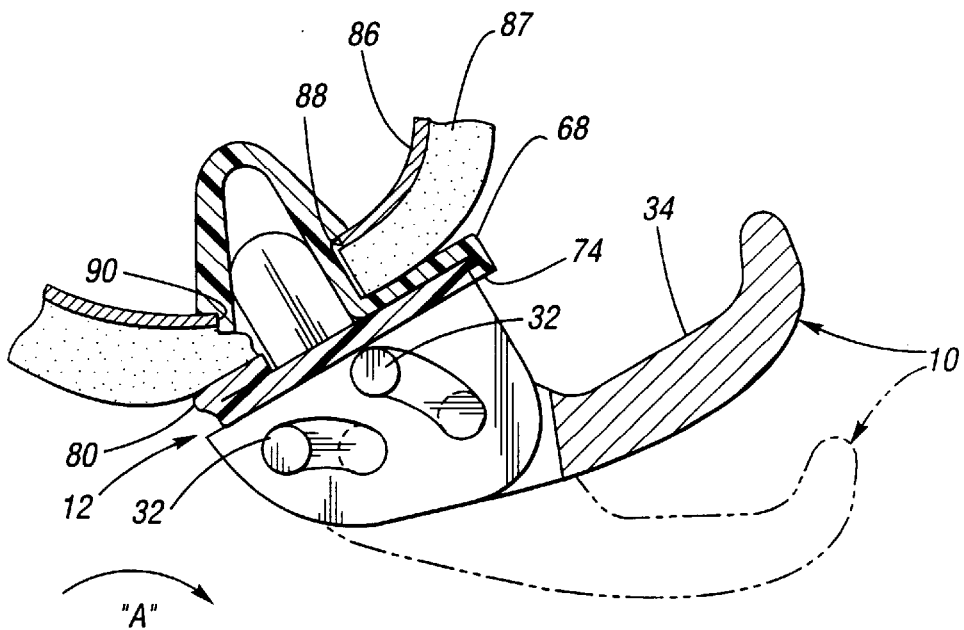
FIG. 3 is a side elevational view, in section, of an assembled coat hook assembly installed in the roof in the passenger compartment of an automobile according to the first embodiment of the invention.
Figure 4:
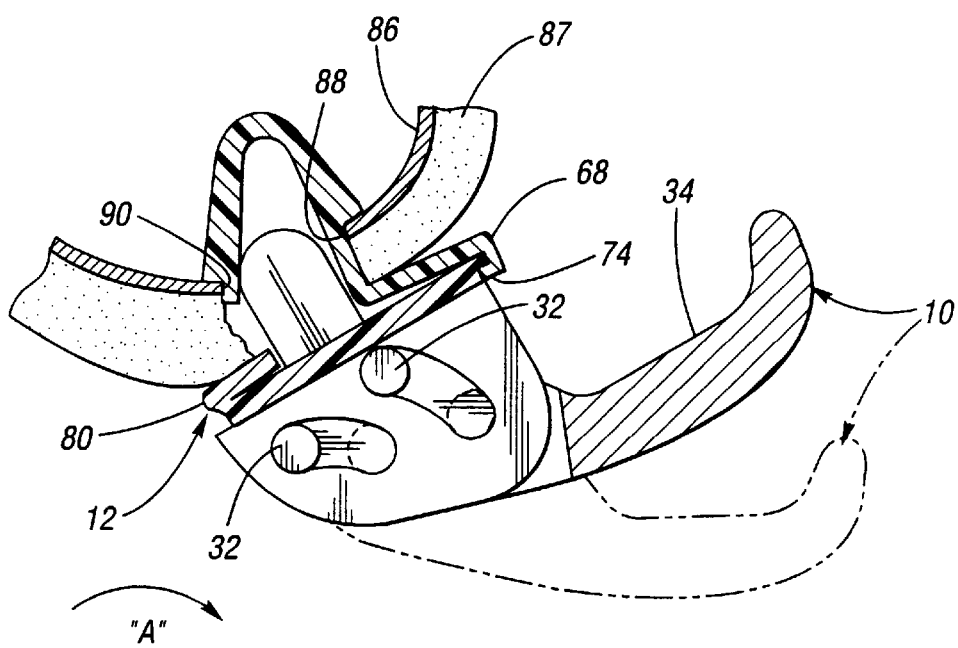
FIG. 4 is a sectional side view of an assembled coat hook assembly installed in the roof in the passenger compartment of an automobile according to the second embodiment of the invention.

The pins 32 in the recessed portion 36 of the coat hook 10 slide horizontally and vertically in the cam slots 38 in the side ribs 20. As shown in FIGS. 3 and 4, the shape of the cam slots 38, 40 can be varied to alter the relative amount of rotational and horizontal movement of the pins 32 in the cam slots. The cam slots 40 depicted in FIG. 2 are designed for less horizontal movement of the pins 32 relative to the horizontal movement of the pins 32 in the cam slots 38 depicted in FIG. 3, thereby varying the downward and outward extension of the elongated shank or hook 34. Only the cam slots 38 will be described, but the same description applies to the cam slots 40.

During assembly, the pins 32 are positioned inside the cam slots 38 by squeezing the side ribs 20 towards each other so that the pins 32 may enter the cam slots 38 via the pin lead-in grooves 22. Once the pins 32 are inserted in the cam slots 38, the side ribs 20 resiliently return to their initial position.

Next, the mounting bracket 12 is secured to the vehicle roof bracket 86 and the pins 32 are locked into the cam slots 38 by rotating the retainer 18 at the hinge 80. The V-shaped mounting clip 16 is secured to the vehicle roof bracket 86 by inserting the opening edge 88 into the slot 52 of the fixed leg 54 and the groove 60 of the leg 28 is biased against edge 90. Then, after the mounting clip 16 is fully inserted into the vehicle roof bracket 86, the retainer 18 is rotated clockwise at the hinge 80 inserting the mandrels 26 through the opening 23 between the legs 54 and 28 and against the inherent bias of leg 28 to press the groove 60 against the opening edge 90 of the vehicle roof bracket 86, thereby expanding the angle of the mounting clip 16 and securing the mounting bracket to the vehicle roof bracket 86.

Upon full rotation of the retainer 18, the mandrels 26 are fully inserted and substantially fill the space between legs 28 and 54, which prevents disengagement of the mounting clip 16 from the vehicle roof bracket 86 and further prevents the movement of the side ribs 20 toward each other to thereby maintain the pins 32 in the cam slots 38. The wedge-shaped tab 68 seats on an undercut 74 (FIG. 2) on the mounting bracket 12. After a ramped portion of the tab 68 slides across the ledge, the tab 68 is releasably locked behind the ledge 82 to hold the retainer 18 in its fully rotated position.

In operation, as illustrated in FIGS. 3 and 4, the coat hook 10 is first lifted upwardly to unseat the pins from the detents, which function as a seat for the hook in the retracted position. The hook is then moved away from the retracted position downwardly and outwardly (in the direction of arrow "A") from the vehicle roof bracket 86 to the extended position (phantom lines) to increase the separation between the roof and the hook, thereby permitting space for receiving several clothes hangers or articles of clothing (not shown). The downward and outward movement occurs because each pair of cam slots on each side rib have different radii of curvature defining their arcuate shape. Preferably, the lower cam slot on each side rib has a shorter radius of curvature than the upper cam slot, which causes the hook to rotate downwardly as well as translate away from the mounting bracket. Also, the lower cam slot can have a different axis of rotation to ensure rotation of the hook. Thus, as the pins are moved from abutting engagement with the slot first ends, along the arcuate path of the slot, to abutting engagement with the second ends, the coat hook rotates downwardly about a moving rotational axis as it translates outwardly. Preferably, when the hook is in retracted position, the coat hook will project out from the headliner to hold 1–2 coat hooks when "stored." The "open" position would then serve to increase coat hook capacity. Alternatively, the hook can be positioned adjacent the headliner 87 in the retracted position and spaced from the headliner 87 in the extended position. Thus, when retracted, and not in use, the coat hook is conveniently out of the way of persons occupying the vehicle passenger compartment.

Reasonable variation and modification are possible within the spirit of the foregoing specification and drawings without departing from the scope of the invention. For example, it is within the scope of the invention to include a spring or other biasing device to automatically return the coat hook to the retracted position when the coat hook is not being used.

What is claimed is:

1. A retractable coat hook assembly for use in a vehicle passenger compartment comprising a roof with a roof bracket and a vehicle headliner positioned adjacent the roof, the roof bracket and headliner having complementary openings for mounting vehicle accessories to the roof while being accessible within the passenger compartment, the retractable coat hook assembly comprising:

a mounting bracket having a mounting portion adapted to be received through corresponding openings in the headliner and roof bracket, the mounting portion having retainer surfaces which are adapted to seat behind the roof bracket to mount the mounting bracket to the roof bracket and within the passenger compartment;

a coat hook having an elongated body with a base and a tip, and the base being mounted to the mounting bracket for rotational and translational movement with respect thereto; and wherein the coat hook is moveable between a retracted and an extended position with respect to the mounting bracket and thereby rotationally and translationally move the coat hook tip away from the mounting bracket.

2. A retractable coat hook assembly according to claim 1 wherein the mounting bracket comprises opposing spaced side ribs and each rib has a slot, each slot has first and second ends, and the coat hook base has opposing spaced side walls corresponding to the side ribs, and each side wall has a pin that is received within the corresponding slot of the corresponding side rib, wherein as the pins slide from the first end to the second end of the slot, the coat hook is moved from the retracted to the extended position.

3. A retractable coat hook assembly according to claim 2 wherein each slot has an arcuate shape and each slot first end is located higher on the side rib than the location of the second end to thereby rotate the coat hook tip away from the mounting bracket as the pins move from the first end to the second end of their corresponding slot when the coat hook is moved from the retracted position to the extended position.

4. A retractable coat hook assembly according to claim 3 wherein each side rib has an inner edge and an opposing outer edge, and each slot second end is located closer to the outer edge of the corresponding side rib than the corresponding slot first end to thereby translate the coat hook away from the mounting bracket as the pins move from the first end to the second end of their corresponding slot as the coat hook is moved from the retracted position to the extended position.

5. A retractable coat hook assembly according to claim 2 wherein the coat hook base comprises a face portion connecting the side walls to define a U-shaped cross section and the pins extend into the interior of the U-shaped cross section and overlie the face portion.

6. A retractable coat hook assembly according to claim 5 wherein each side rib has a lead-in groove extending from a peripheral edge of the side rib to one of the first and second ends of the slot to aid in the insertion of the pins into the slots.

7. A retractable coat hook assembly according to claim 2 wherein the side ribs are spaced a sufficient distance to permit the insertion of the side ribs between the side walls.

8. A retractable coat hook assembly according to claim 2 wherein the mounting bracket further comprises a platform connecting the side ribs and the mounting portion extends from the platform in a direction generally opposite the side ribs.

9. A retractable coat hook assembly according to claim 8 wherein the mounting portion comprises a fixed leg and a spring leg connected at their upper ends to define an inverted V-shaped cross section with an apex defined by the connected upper ends of the legs, the fixed leg is fixedly mounted to the platform, and the spring leg is resiliently connected to the first leg at the apex, the fixedly mounted leg has a slot adapted to receive an edge portion of the roof opening and the spring leg has a groove adapted to receive another edge portion of the roof opening to mount the mounting portion to the roof.

10. A retractable coat hook assembly according to claim 9 wherein the mounting bracket further comprises a retainer having a mandrel and the retainer being hingedly mounted to the platform for movement between an unlocked position where the mandrel is free from the mounting clip legs and a locked position where the mandrel is disposed between the mounting clip legs to prevent the deflection of the spring leg away from the roof opening edge and to thereby prevent the removal of the mounting clip.

11. A retractable coat hook assembly according to claim 10 wherein the retainer includes a cross rib to prevent inward deflection of bracket side ribs.

12. A retractable coat hook assembly according to claim 2 wherein each side rib has two slots, each side wall has two pins and each pin is positioned in a slot.

13. A retractable coat hook assembly for use in a vehicle passenger compartment comprising a roof with a roof bracket and a vehicle headliner positioned adjacent the roof, the roof and headliner having complementary openings for mounting vehicle accessories to the roof while being accessible within the passenger compartment, the retractable coat hook assembly comprising:

a mounting bracket having a mounting portion adapted to be received through corresponding openings in the headliner and roof bracket, the mounting portion having retainer surfaces which are adapted to seat behind the roof bracket to mount the mounting bracket to the roof bracket and within the vehicle passenger compartment and having opposing spaced side ribs with each rib having a pair of arcuate slots and each slot having first and second ends; and a coat hook having an elongated body with a base and a tip, the base comprising opposing spaced side walls corresponding to the side ribs, and each side wall having a pair of pins received within the corresponding slot of the corresponding side rib, wherein as the pins are slid from the first end to the second end of the slots, the coat hook is moved from the retracted to the extended position where the coat hook tip is rotated downwardly and translated away from the mounting bracket relative to the position of the coat hook tip in the retracted position.

14. A retractable coat hook assembly according to claim 13 wherein the slots of each pair of slots have different radii of curvature to thereby rotate the coat hook tip away from the mounting bracket as the pins are slid from the first end to the second end of their corresponding slot when the coat hook is moved from the retracted position to the extended position.

15. A retractable coat hook assembly according to claim 14 wherein each side rib has an inner edge and an opposing outer edge, and each slot second end is located closer to the outer edge of the corresponding side rib than the location of the corresponding slot first end to thereby translate the coat hook away from the mounting bracket as the pins are slid are slid from the first end to the second end of their corresponding slot as the coat hook is moved from the retracted position to the extended portion.

16. A retractable coat hook assembly according to claim 13 wherein the coat hook base comprises a face portion connecting the side walls to define a U-shaped cross section and the pins extend into the interior of the U-shaped cross section and overlie the face portion.

17. A retractable coat hook assembly according to claim 16 wherein each side rib has a lead-in groove extending from a peripheral edge of the side rib to the second end of another slot to aid in the insertion of the pins into the slots.

18. A retractable coat hook assembly according to claim 13 wherein the side ribs are spaced a sufficient distance to permit the insertion of the side ribs between the side walls.

19. A vehicle comprising:

a roof with a mounting bracket and defining a portion of a passenger compartment with the roof bracket having an opening; and a retractable coat hook assembly comprising:

a mounting bracket having a mounting portion adapted to be received through the roof bracket opening, the mounting portion having retainer surfaces which seat behind the roof bracket to mount the mounting bracket within the vehicle passenger compartment;

a coat hook having an elongated body with a base and a tip, and the base being moveably mounted to a portion of the mounting bracket for rotation between a retracted position and an extended position; and wherein as the coat hook is moved from the retracted position to the extended position, the coat hook is rotated downwardly and translated away from the mounting bracket.

20. A vehicle according to claim 19 wherein the mounting bracket comprises opposing spaced side ribs and each rib has a pair of slots, each slot with first and second ends, and the coat hook base has opposing spaced side walls corresponding to the side ribs, and each side wall has a pair of pins, each pin being received within the corresponding slot of the corresponding side rib, wherein as the pins are slid from the first end to the second end of the slot, the coat hook is moved from the retracted to the extended position.

21. A vehicle according to claim 19 wherein the slots of each pair of slots have different radii of curvature to thereby rotate the coat hook away from the mounting bracket as the pins are slid from the first end to the second end of their corresponding slot to move the coat hook from the retracted position to the extended position.

22. A vehicle according to claim 21 wherein each side rib has an inner edge and an opposing outer edge, and each slot second end is closer to the outer edge of the corresponding side rib than the corresponding slot first end to thereby translate the coat hook away from the mounting bracket as the pins are slid from the first end to the second end of their corresponding slot to move the coat hook from the retracted position to the extended position.

23. A vehicle according to claim 18 wherein the second end of each slot has a detent sized to receive a pin to hold the hook in the retracted position.

* * * * *

UNITED STATES PATENT AND TRADEMARK OFFICE
CERTIFICATE OF CORRECTION

PATENT NO : 6,065,657
DATED : May 23, 2000
INVENTOR(S) : DOUGLAS A. FISCHER

It is certified that error appears in the above-identified patent and that said Letters Patent are hereby corrected as shown below:

Column 6, Line 42, Claim 17: insert --first end of one slot and another lead-in groove extending from the peripheral edge to--.

Signed and Sealed this

Third Day of April, 2001

Attest:

NICHOLAS P. GODICI

Attesting Officer    Acting Director of the United States Patent and Trademark Office